May 28, 1963

T. A. DWORAK 3,091,078

EXHAUST-GAS COMBUSTION DEVICE

Filed May 5, 1960

INVENTOR.
THEODORE A. DWORAK
BY
Reif and Gregory
ATTORNEYS

United States Patent Office 3,091,078
Patented May 28, 1963

3,091,078
EXHAUST-GAS COMBUSTION DEVICE
Theodore A. Dworak, 703 Sherburne, St. Paul, Minn.
Filed May 5, 1960, Ser. No. 27,039
2 Claims. (Cl. 60—30)

This invention relates to an exhaust-gas combustion device for use in connection with an internal combustion engine for the purpose of providing for complete combustion of the material in the gases exhausted by the cylinders of said engine whereby there will be discharged to the atmosphere only carbon dioxide and some water and not the dangerous fumes of carbon monoxide.

It is well known that exhaust gases resulting from the use of internal combustion engines, as in automotive vehicles, represent a principal source of pollution of the atmosphere generally and particularly in concentrated urban areas. In such urban areas these exhaust gases have presented a critical health problem.

It is desirable to have an efficient yet simple means of modifying the presently used means for exhausting gases in order to effect a complete combustion of said exhaust gases so far as any dangerous fumes are concerned. It is desirable to have such a complete combustion of such exhaust fumes that what is discharged to the atmosphere consists only of carbon dioxide and water. It is desirable to have such means as can be readily fitted into and become a rather simple modification of presently used exhaust equipment.

It is an object of this invention therefore to provide means which represents a modification of a presently used manifold so that combustion may be supported within said manifold and that there actually takes place within said manifold the combustion of the unburned particles passing thereinto from the cylinders of the engine.

It is another object of this invention to provide a supply of air from the atmosphere to be drawn into a manifold structure by the passage of exhaust gases from the cylinders of the engine into the manifold whereby said air together with the heat of said exhaust gases will support combustion of unburned particles present in said gases with said combustion taking place within said manifold structure.

It is also an object of this invention to have said manifold structure as set forth in the previous object exhaust into a heating chamber having material therein adapted to sustain and refract the heat of exhaust gases to provide a final chamber for combustion before said gases are discharged to the atmosphere.

It is a more specific object of this invention to provide a manifold structure to be used in connection with an internal combustion engine, said manifold structure having passages extending to the cylinders of said engine, an air conduit extending adjacent said manifold structure and passages, said air conduit having a common wall with each of said passages, apertures respectively in said common walls to provide communication between said air conduit and said passages whereby exhaust gases passing through said passages from the cylinders of said engine into said manifold will draw air from said air conduit through said apertures whereby the presence of said air and the heat of said gases will support combustion of unburned particles present within said gases within said manifold structure, a chamber having communication with said manifold structure, material within said chamber adapted to sustain and refract the heat of said exhaust gases to support combustion of unburned particles within said gases, a plurality of baffle plates disposed within said manifold structure to deflect said exhaust gases in the direction of said chamber, a baffle plate within said chamber to deflect gases entering therein in the direction of said material, and means for discharging said gases from said chamber to the atmosphere.

These and other objects and advantages of the invention will be fully set forth in the following description made in connection with the accompanying drawings in which like reference characters refer to similar parts throughout the several views and in which.

Figure 1:
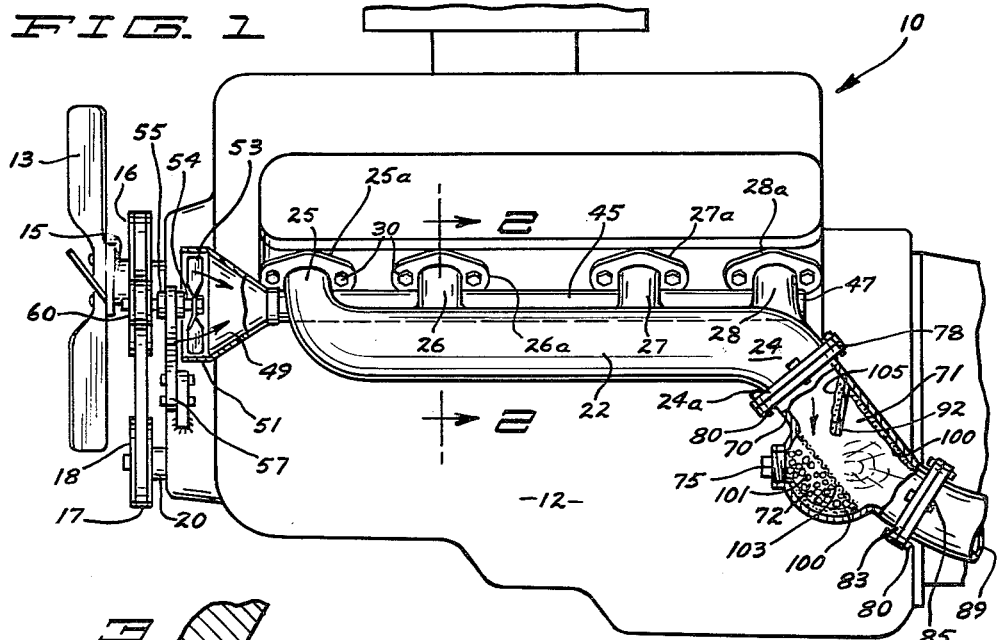
FIG. 1 is a view in side elevation of an internal combustion engine showing applicant's device in operating position.
Figure 2:
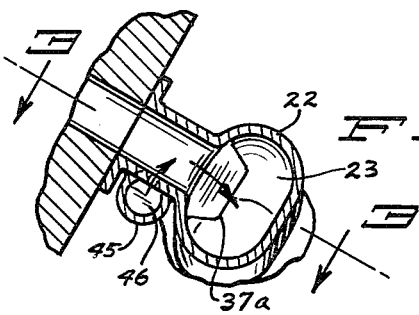
FIG. 2 is a view in vertical section on an enlarged scale taken on line 2—2 of FIG. 1 as indicated by the arrows.

Referring to the drawings, an internal combustion engine 10 is indicated comprising an engine block 12 having a fan blade 13 mounted on a shaft 15 carrying a sprocket 16 having a belt 17 pass thereover and over a sprocket 18 mounted on and driven by a shaft 20.

Only one side of said engine 10 is shown, and said engine is indicated here as being a V-type engine. The side of the engine not illustrated is identical with what is shown. The apparatus hereinafter described will have an identical counterpart structure mounted on the side of the engine not shown.

Extending along the illustrated side of said engine 10 is a manifold housing 22. Said housing may be variously formed but is here simply constructed as is indicated and it will be made of a suitable material such that said manifold may serve as a combustion chamber for the combustion of unburned particles of gases exhausted or discharged therethrough. Formed within said manifold is a chamber 23.

Formed outwardly of said manifold 22 integral therewith and indicated here as being substantially cylindrical in form are short conduits 25, 26, 27 and 28 formed as nipple-like members respectively having flanges 25a, 26a, 27a and 28a formed at their outer ends and being secured to said engine block 10 by bolts 30. Said nipple-like members 25–28 respectively have formed therein passages 35, 36, 37 and 38 which are in alignment with and provide communication between said cylinders 40, 41, 42 and 43 and said chamber 23. Said nipple 25 is here shown formed of a restricted forward end portion of said manifold 22. End portion 24 forming the exhaust or discharge end of said manifold is shown curved downwardly and has formed about its outer end a flange 24a.

Depending from the forward side of said passages 36, 37 and 38 and being angled rearwardly are baffles 36a, 37a and 38a adapted to respectively deflect rearwardly gases passing through said passages.

Underlying said nipples 25–28 and extending along said manifold 22 is a conduit 45 having an air passage 46 formed therein and having a closed rear end 47. The forward end 49 of said conduit 45 flares outwardly forming an air inlet having an outer cylindrical peripheral band-like portion 51 having disposed therein a fan 53 mounted on a shaft 54 journaled in a hub 55 mounted on and supported by an engine block mounted bracket 57. Said shaft 54 has a pulley 60 mounted on its free end with said pulley being driven by said belt 17 passing thereover. Said passage 46 will have communication with the atmosphere.

Figure 3:
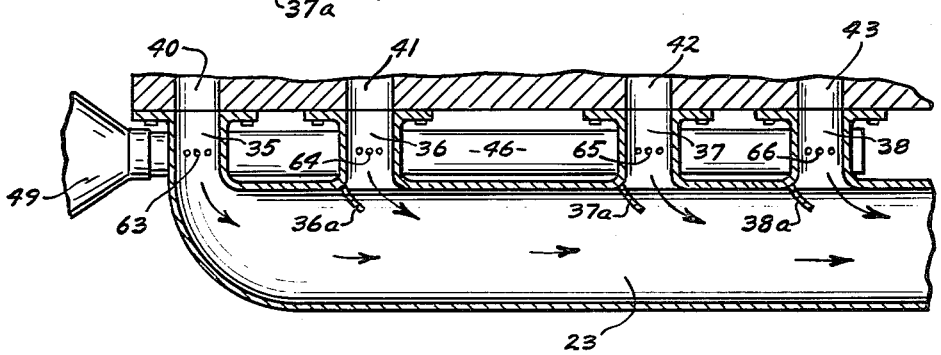
FIG. 3 is a fragmentary view on an inclined plane taken on line 3—3 of FIG. 2 as indicated by the arrows.

Said conduit 45 in underlying said nipples 25–28 is formed to have a common wall with a portion of each of said nipples at each point where underlying said nipples. Communications between the air passage 46 in said conduit 45 and the passages 35–28 may be variously provided. Said communication is here effected by apertures 63, 64, 65 and 66, as indicated in FIG. 3. Said apertures will be of a suitable size and of a suitable number though here are shown as being formed in groups of three in number.

Connected to the discharge or exhaust end 24 of said manifold 22 is a relatively short coupling 70 shown here having formed therein a chamber 71 and being formed to have a depending or lower pouch portion 72 with said pouch portion having a cleanout plug 75 therein. Said coupling 70 has a flange 78 at one end mating with said flange 24a and being secured thereto by bolts 80. Though not here shown, in actual practice a gasket will be seated between said flanges. The other end of said conduit 70 has a flange 83 adapted to mate with a flange 85 and be secured thereto by bolts 86 for communication with an exhaust pipe 89 to exhaust to the atmosphere in the usual manner.

Angled downwardly from the upper wall of said conduit 70 is a baffle 92 adapted to deflect exhaust gases in the direction of said pouch 72.

Said chamber 71 and pouch 72 will be constructed to sustain and refract the intense heat of the gases exhausted from said cylinders 40–43. Said chamber and pouch may be variously formed to accomplish this result. In the embodiment of the invention here indicated, said chamber and pouch are indicated as being respectively lined with a refractory material 100, such as fire clay. Disposed in said pouch 72 additionally will be a plurality of pellets 101 formed as of fire clay and retained in position by a meshed or screen-like member 103. Said baffle 92 will have a rear facing of fire clay material 105.

In operation, the cylinders 40–43 will discharge gases into the manifold in the order of their firing respectively through the passages 35–38. Said air conduit 45 will have air pass thereinto through the inlet 49. Said air will be caused to pass into said air conduit both by the movement of the vehicle and by the action of the fan 53 which will be driven by the means driving the radiator fan of the vehicle. As said air passes into the passage 46 of the air conduit 45, the gases discharged from the cylinders of the engine in passing through the passages 35–38 will draw said air through the apertures 63–66 and will thus form a combustible mixture. Very little air pressure is needed for the mixture of the air with the exhaust gases as the applicant, as is obvious, is employing a Venturi principle to effect this mixture.

As said exhaust gases enter into the chamber 23 of said manifold 22, said gases will be deflected by the baffles 36a–38a in the direction of the exhaust or discharge end of said manifold. At the instant of the mixture of the fresh air with the exhaust gases discharged from said cylinders, combustion of combustible particles in said gases will take place immediately whereby said manifold structure in effect becomes a combustion chamber. There is sufficient heat present in said exhaust gases and in the combustion which takes place within said chamber to support continuous combustion with the admixture of fresh air with the exhaust gases. The product of this combustion will pass toward and through the discharge end 24 of said manifold.

At said discharge end of said manifold 22 there is formed the chamber 71 having a lower pouch portion 72 therein with said chamber and said pouch portion being lined with a refractory material, such as fire clay, and additionally in said pouch portion there will be a supply of refractory type pellets. A baffle 92 depends downwardly in said chamber and deflects exhaust gases entering therein in the direction of said pouch portion 71. Said baffle will also have its surface first contacted by said exhaust gases covered with a layer of refractory material. Thus said chamber 70 and the pouch 71 with the pellets therein will sustain the heat of exhaust gases and this has been found to be sufficient to support combustion together with air mixed into the exhaust gases as above indicated. Substantially all of the combustible materials present in the exhaust gases entering into said chamber 70 will be faced with complete combustion in this chamber. Thus there will be discharged from said chamber 70 to the atmosphere what essentially comprises carbon dioxide and by the time that this passes through the muffler and tail pipe assembly used in connection therewith there will be some condensation so that there will finally be discharged to the atmosphere carbon dioxide and water. The carbon dioxide is considered to be harmless, and the carbon monoxide present in the exhaust gases at the time of their discharge from the cylinders in the engine will have become completely converted and rendered harmless.

Thus it is seen that I have provided a modified manifold structure adapted for use with the exhaust system of a motor vehicle which provides a combustion chamber for the effective combustion of all harmful gases or particles present in the exhaust gases from the cylinders of the engine so that what is finally discharged to the atmosphere will not pollute the atmosphere with any harmful ingredients.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. An exhaust-gas burning device for a multi-cylinder internal combustion engine having in combination, an elongated tubular housing along one side of said engine having a combustion chamber therein, said combustion chamber having a discharge outlet at one end thereof, passages respectively connecting the cylinders in said engine and said housing, said passages having inlets opening into said cylinders and outlets discharging into said chamber, an air passage connecting the atmosphere and each of said passages at points inwardly of said outlets, a second combustion chamber connected to said first chamber and having a straight passage therethrough and forming an extension of said first chamber and communicating with the atmosphere, a depending pouch in said second chamber, particles of refractory material in said pouch, a retaining screen overlying said pouch, a deflecting member in said second chamber extending in the direction of said pouch, and a cleanout plug for communication with said pouch.

2. The structure set forth in claim 1, said second chamber being removably connected to said first chamber.

References Cited in the file of this patent
UNITED STATES PATENTS

| 2,038,567 | Ittner | Apr. 28, 1936 |
| 2,217,241 | Tendler | Oct. 8, 1940 |
| 2,771,736 | McKinley | Nov. 27, 1956 |

FOREIGN PATENTS

| 185,890 | Great Britain | Sept. 21, 1922 |
| 413,967 | Great Britain | July 26, 1934 |